United States Patent
Srinivasan et al.

(10) Patent No.: US 11,768,899 B2
(45) Date of Patent: Sep. 26, 2023

(54) SYSTEMS AND METHODS TO CURATE NOTIFICATIONS FROM UNSUBSCRIBED SOCIAL MEDIA ACCOUNTS

(71) Applicant: ROVI GUIDES, INC., San Jose, CA (US)

(72) Inventors: Madhusudhan Srinivasan, Bangalore (IN); Vijay Kumar, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/857,884

(22) Filed: Jul. 5, 2022

(65) Prior Publication Data

US 2023/0004611 A1     Jan. 5, 2023

Related U.S. Application Data

(63) Continuation of application No. 16/424,122, filed on May 28, 2019, now Pat. No. 11,409,824.

(51) Int. Cl.
| | |
|---|---|
| *H04L 12/58* | (2006.01) |
| *G06F 16/95* | (2019.01) |
| *G06F 16/9536* | (2019.01) |
| *H04L 51/52* | (2022.01) |
| *H04L 51/212* | (2022.01) |
| *H04L 51/224* | (2022.01) |

(52) U.S. Cl.
CPC ........ *G06F 16/9536* (2019.01); *H04L 51/212* (2022.05); *H04L 51/224* (2022.05); *H04L 51/52* (2022.05)

(58) Field of Classification Search
None
See application file for complete search history.

(56) References Cited

U.S. PATENT DOCUMENTS

| | | | |
|---|---|---|---|
| 10,692,131 B2* | 6/2020 | Abraham | G06Q 30/08 |
| 2015/0113434 A1 | 4/2015 | Lineberger et al. | |
| 2016/0112357 A1* | 4/2016 | Lineberger | H04L 67/306 |
| | | | 709/204 |
| 2016/0248865 A1* | 8/2016 | Dotan-Cohen | H04L 67/55 |
| 2019/0043137 A1 | 2/2019 | Mathis | |
| 2020/0329005 A1* | 10/2020 | Anerella | H04L 51/046 |

* cited by examiner

*Primary Examiner* — Natisha D Cox
(74) *Attorney, Agent, or Firm* — HALEY GUILIANO LLP

(57) ABSTRACT

Methods and systems for curating notifications from unfollowed accounts are described herein. The system tracks that a first account previously followed a second account and subsequently unfollowed the second account. The system identifies an interest of the first account and monitors the activities of the second account for activity that matches the interest. If there is a match between the interest and an activity of the second account, the system notifies the first account of the activity. These methods and systems provide the user with relevant information from unfollowed accounts.

20 Claims, 11 Drawing Sheets

SYSTEMS AND METHODS TO CURATE NOTIFICATIONS FROM UNSUBSCRIBED SOCIAL MEDIA ACCOUNTS

CROSS-REFERENCE TO RELATED APPLICATIONS

This application is a continuation of U.S. patent application Ser. No. 16/424,122, filed May 28, 2019, which is hereby incorporated by reference herein in its entirety.

BACKGROUND

The present disclosure is directed to notification systems and, more particularly, to notification systems that alert a user about relevant updates from unfollowed accounts.

SUMMARY

Social media allows users to keep up with other users, news sources, and topics of interest. Users can follow various accounts in order to receive notifications and posts from those accounts. Users may additionally change their following settings for accounts as their interests change. Current systems are limited in that they are binary—a user either follows an account or does not follow an account. Systems are unable to distinguish between unfollowed accounts (e.g., accounts that a user previously followed and subsequently unfollowed) and accounts that were never followed by a user. This is a shortcoming of current systems, as unfollowed accounts can still be a valuable source of information. The fact that the user followed a certain account at one point typically indicates some relationship or interest between the two accounts. The unfollowed account is therefore more likely to have information relevant to the user than is an account with which the user has never interacted. The inability of current systems to distinguish between unfollowed and never-followed accounts and to utilize this additional source of information therefore deprives the user of valuable information. Thus, systems and methods are needed which allow for a user to receive relevant information from accounts that the user no longer follows.

Solutions to the problem described above include distinguishing between unfollowed accounts and never-followed accounts so that the system may track the activity of unfollowed accounts. To do this, the system may tag accounts that the user unfollows by adding an identifier. Additionally or alternatively, the system may store unfollowed accounts in a separate list. The system may use alternative methods for distinguishing unfollowed accounts from other accounts, as well. In some embodiments, an unfollowed account may include an account that the user has muted or blocked. In some embodiments, unfollowing may include unfriending, unsubscribing, or otherwise removing an account. The system may determine whether any activities of the unfollowed accounts match an interest of the user. In some embodiments, an interest is an upcoming event in the user's calendar. The system may determine that an activity of the unfollowed account matches the event by determining that the activity matches a location or a time of the event. In some embodiments, an interest is a reservation or a travel itinerary. The system may determine that an activity of the unfollowed account matches the reservation or itinerary by determining that the activity has the same location and time as the reservation or itinerary. In some embodiments, an interest is a user preference specified in the user's profile. The system may determine that an activity of the unfollowed account relates to the user preference through keyword matching or another analysis.

There are several additional considerations that the system may use when searching for relevant content. For example, the system may set a relevance threshold which any activity from an unfollowed account must meet in order for the system to notify the user of the activity. The relevance threshold may be higher for activity from unfollowed accounts than for activity from accounts that the user has never followed, as the user has expressed disinterest by ceasing to follow the unfollowed account. The system may alter the relevance threshold for unfollowed accounts for a variety of reasons. In some embodiments, the system may set lower relevance thresholds for unfollowed accounts that have a familial tie with the user. In some embodiments, the system may set lower relevance thresholds for activity that is marked as important. For example, the system may mark an update about a crisis or natural disaster as important and thus may lower the relevance threshold for that activity. The system may additionally or alternatively apply a different relevance threshold based on whether or not the unfollowed account follows the user back.

There are several techniques that can be used to carry out the search and notification processes of the present disclosure. In some embodiments, the system may pull data from the user's profile, emails, social media posts, events, reservations, and itineraries. The system may parse this data for keywords, metadata, and any other useful information. The system may then use this data to create search filters. For example, the system may create a filter to return any results that contain a certain keyword. In some embodiments, the system may create a filter to return any results that are similar to the user's data (e.g., through use of a knowledge graph). In some embodiments, the system may generate a filter for any results that match the time and location of an event, reservation, or itinerary from the user's data. The system may monitor unfollowed accounts and search through activities using the generated filters. If the system identifies a match, it may compare the relevance level between the user's data and the activity to the relevance threshold. If the relevance exceeds the relevance threshold, the system may notify the user of the activity. The system may additionally or alternatively recommend an action to the user (e.g., to change a reservation) based on the notification.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for providing a user with relevant information from unfollowed accounts. The system may determine that an unfollowed account posted something that the user may wish to see, regardless of the unfollowed status. The system may base this determination upon user preferences, events, travel plans, social media activity, text and email data, or any other data source. Once the system identifies a relevant activity from the unfollowed account, the system may compare the activity to a relevance threshold. This threshold may be based upon importance of the activity, a relationship between the user's account and the unfollowed account, or any other factor. If the system determines that the activity meets or exceeds the relevance threshold, the system may then notify the user of the activity of the unfollowed account.

Figure 1:
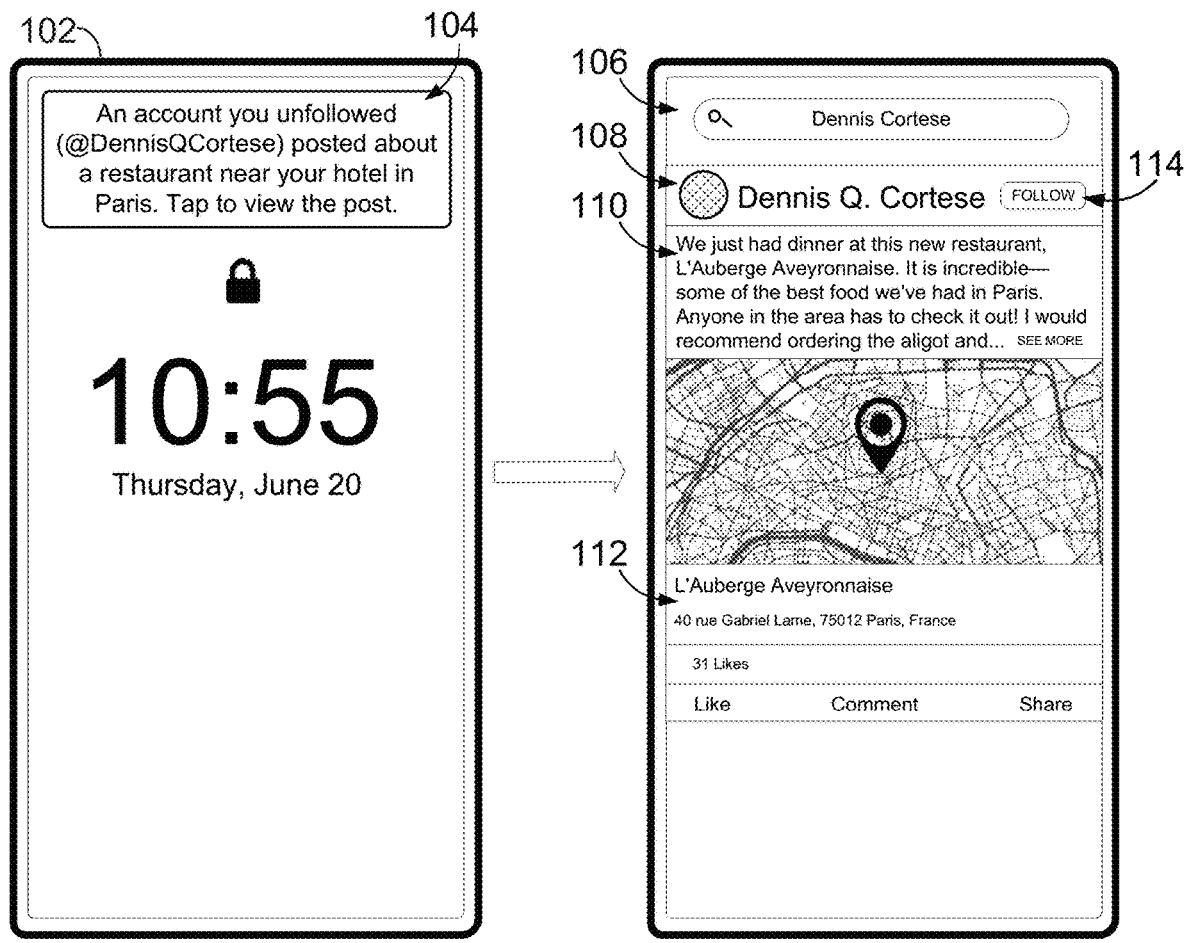
FIG. 1 shows an illustrative example of a notification and display of a post from an unfollowed account that relates to a user's travel plans, in accordance with some embodiments of the disclosure.

FIG. 1 shows an illustrative example 100 of a notification and display of a post from an unfollowed account that relates to a user's travel plans, in accordance with some embodiments of the disclosure. In some embodiments, unfollowed accounts may be an account that the user previously followed but has since unfollowed. In some embodiments, an unfollowed account may include an account that the user has muted or blocked. In some embodiments, unfollowing may include unfriending, unsubscribing, or otherwise removing an account. In FIG. 1, a user device 102 displays a notification 104 which alerts the user of an activity from an unfollowed account. In some embodiments, the system may offer the user an option to view or ignore the post. In some embodiments, the system may include a preview of the post or the entire post in notification 104. Notification 104 includes an identifier of the unfollowed account (e.g., @DennisQCortese) as well as the user interest to which the activity is relevant. In this example, the activity is relevant to the user's upcoming travel plans, i.e., the activity is about a restaurant near the user's hotel in Paris. The system may access booking information (e.g., confirmation emails, calendar entries, social media events, etc.) to identify the user's hotel in Paris. The system may identify that the post by the unfollowed account is relevant to the user's hotel in Paris based on keyword analysis, such as the name of the restaurant, the word "Paris," or the address of the restaurant in the post. The system may compare the location of the restaurant to the location of the user's hotel to determine that they are nearby.

In some embodiments, the user may tap on or swipe notification 104 in order to view the post. Additionally or alternatively, the system will alert the user of the activity within the platform (e.g., Facebook, Instagram, Twitter, etc.) on which the activity was posted. In some embodiments, the system may add the activity to the user's feed within the platform. In this example, if the user taps on the notification, the user is directed to page 106 within a social media platform. Page 106 displays the post from the unfollowed account. Page 106 may display an identifier of the unfollowed account (e.g., identifier 108). The identifier may comprise a profile picture, a profile name, a social media handle, a link to the unfollowed account's home page, an option to re-follow the account (e.g., button 114), and any other identifying information. Page 106 may additionally display the post of the unfollowed account along with any other relevant information. For example, if the post relates to a location, the post may include a map, address, or link for the location (e.g., location 112). In some embodiments, if the post relates to an event, the post may include a description of or link to the event.

Figure 2:
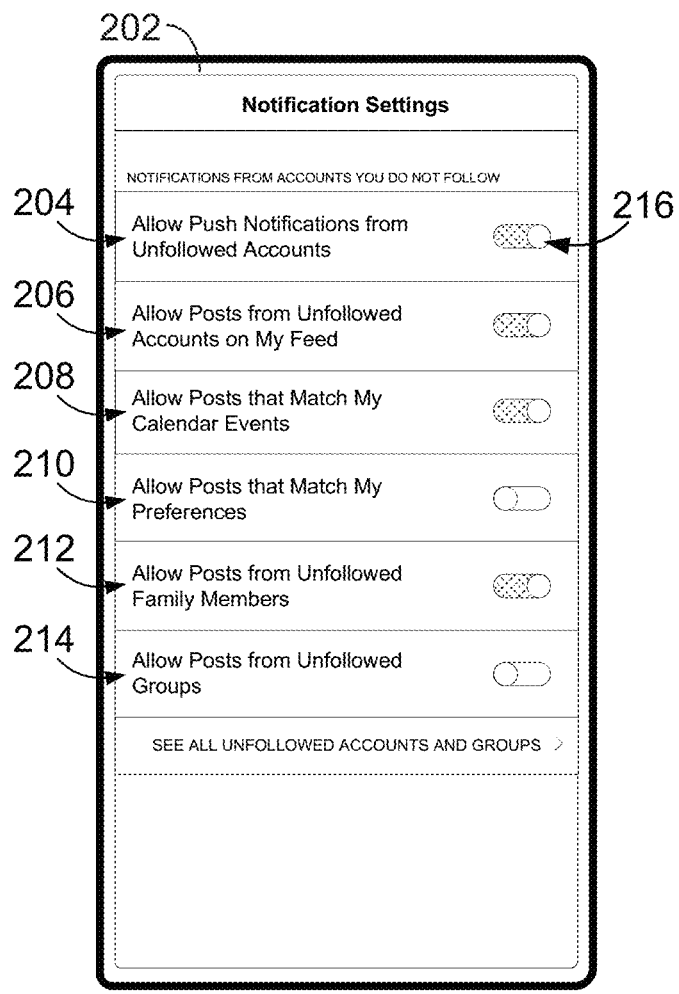
FIG. 2 shows an illustrative display of settings for receiving notifications and updates about posts from unfollowed accounts, in accordance with some embodiments of the disclosure.

While FIG. 1 shows the notification and display of a post from an unfollowed account, FIG. 2 shows an illustrative user device 200 having settings for receiving notifications and updates about posts from unfollowed accounts, in accordance with some embodiments of the disclosure. User device 200 includes a display 202 which displays a series of notification settings. These notification settings relate to notifications sent to the user within the platform. The first setting 204 controls whether the system sends the user push notifications (e.g., pop-up alerts) on the user device (e.g., notification 104 on device 102 in FIG. 1). The user may move the toggle (e.g., toggle 216) in order to turn this setting on or off. Setting 206 controls whether the system includes posts from unfollowed accounts on the user's feed in the platform. In some embodiments, if this setting is enabled, the system may send the user push notifications about posts from unfollowed accounts which have a very high relevance rating and may add posts having a lower relevance rating to the user's feed.

Setting 208 controls whether the system searches for and displays posts from unfollowed accounts which match the user's calendar events. This setting enables the system to create search filters based on calendar events when searching through posts from unfollowed accounts for relevant information. The system may first analyze each calendar event and extract key words, locations, event titles, and times. The system may then compile this information into a filter. Any posts from unfollowed accounts which match the information from the calendar event and are determined to be relevant to the user are displayed to the user.

Setting 210 controls whether the system searches for and displays posts matching the user's preferences. The user's preferences may be specific to the platform. For example, the user may enter multiple interests, preferences, and settings when creating the user profile on the platform. The system may additionally or alternatively track content (e.g., posts, videos, advertisements, etc.) within the platform with which the user positively engages. For example, if the user follows an artist and likes or comments on a series of posts from the artist, the system may determine that the user is interested in the artist. In some embodiments, the system may determine interests of the user based on posts that the user makes on the platform. For example, if the user posts about a restaurant the system may identify the restaurant or cuisine as an interest of the user. If setting 210 is enabled, the system may alert the user of posts from unfollowed accounts which relate to the artist.

Setting 212 controls whether the system alerts the user of posts from unfollowed family members. The system may determine relationships between users by prompting the user to input their relationship to another user. In some embodiments, the system may determine that the unfollowed account is a family member by comparing user names, analyzing mutual connections, or other means. If setting 212 is enabled, the system may lower the relevance threshold for posts from unfollowed family members.

Setting 214 controls whether the system alerts the user of relevant posts from unfollowed groups. In some scenarios, a user may leave a group on a platform due to a dislike of the content that is posted by other group members. However, some content posted by group members may still be relevant to the user even after the user has unfollowed the group. Therefore, if setting 214 is enabled, the system may search unfollowed groups for posts that may be relevant to the user.

It will be understood that FIGS. 1 and 2 are shown for illustrative purposes and that not all of the settings and details need to be included. For example, in reference to FIG. 2, instead of offering the user a series of settings, the system may display an option to view or ignore a post from an unfollowed each time the system alerts the user of the post. The system may alternatively include more settings or variations of the settings shown in FIG. 2 across various platforms.

Figure 3:
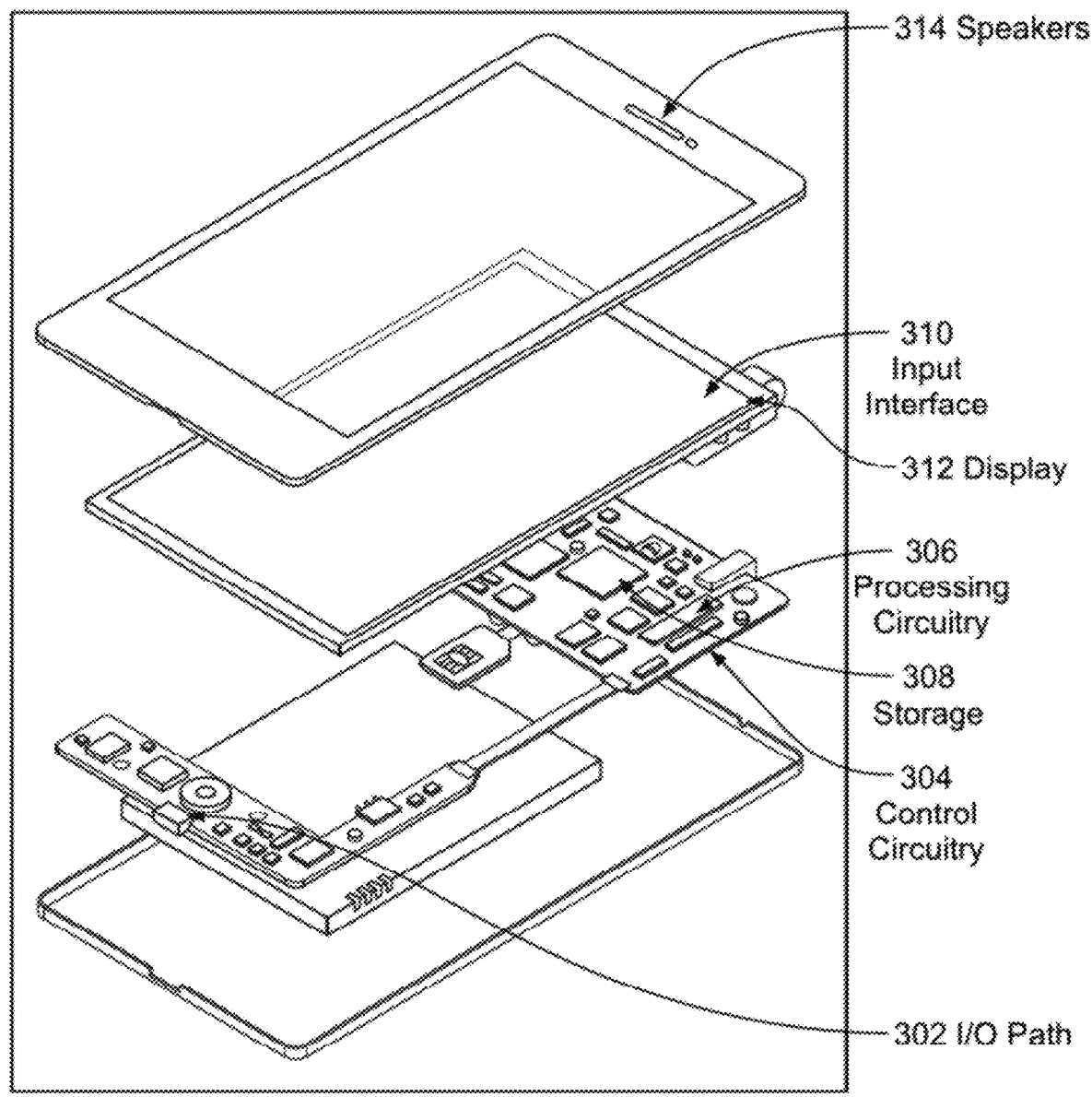
FIG. 3 is a block diagram of an illustrative user equipment, in accordance with some embodiments of the present disclosure.

In some embodiments, the methods and systems described in connection with FIGS. 1 and 2 utilize a media device on which to display the notifications and posts to the user. FIG. 3 shows a generalized embodiment of illustrative media device 300. As referred to herein, the phrase "media device" should be understood to mean any device that can output notifications and display posts. As depicted, media device 300 may be a smartphone or tablet, or may additionally be a personal computer or television equipment.

Media device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for generating for display notifications based on settings stored in memory (i.e., storage 308).

A social media platform may be a stand-alone application implemented on a media device or a server. The social media platform may be implemented as software or a set of executable instructions. The instructions for performing any of the embodiments discussed herein of the social media platform may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 3 the instructions may be stored in storage 308, and executed by control circuitry 304 of media device 300.

In some embodiments, a social media platform may be a client-server application where only the client application resides on media device 300 (e.g., device 402), and a server application resides on an external server (e.g., server 406). For example, a social media platform may be implemented partially as a client application on control circuitry 304 of media device 300 and partially on server 406 as a server application running on control circuitry. Server 406 may be a part of a local area network with media device 402, or may be part of a cloud computing environment accessed via the Internet. In a cloud computing environment, various types of computing services for performing searches on the Internet or informational databases, gathering information for a display (e.g., information for creating a feed within the social media platform), or parsing data are provided by a collection of network-accessible computing and storage resources (e.g., server 406), referred to as "the cloud." Media device 300 may be cloud clients that rely on the cloud computing capabilities from server 406 to gather data to populate a social media platform. When executed by control circuitry of server 406, the system may instruct the control circuitry to generate for display the notifications and posts and transmit the notifications and posts to media device 402. The client application may instruct control circuitry of the receiving media device 402 to generate the notifications and posts for output. Alternatively, media device 402 may perform all computations locally via control circuitry 304 without relying on server 406.

Control circuitry 304 may include communications circuitry suitable for communicating with a social media server or other networks or servers. The instructions for carrying out the above-mentioned functionality may be stored and executed on server 406. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of media devices, or communication of media devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 406) may be used to supplement storage 308 or instead of storage 308.

Control circuitry 304 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 304 may also include scaler circuitry for upconverting and downconverting content into the preferred output format of the media device 300. Circuitry 304 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 308 is provided as a separate device from media device 300, the tuning and encoding circuitry (including multiple tuners) may be associated with storage 308.

A user may send instructions to control circuitry 304 using user input interface 310 of media device 300. User input interface 310 may be any suitable user interface touch-screen, touchpad, stylus and may be responsive to external device add-ons such as a remote control, mouse, trackball, keypad, keyboard, joystick, voice recognition interface, or other user input interfaces. User input interface 310 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Speakers 314 may be provided as integrated with other elements of media device 300 or may be stand-alone units. Display 312 may be used to display visual content while audio content may be played through speakers 314. In some embodiments, the audio may be distributed to a receiver (not shown), which processes and outputs the audio via speakers 314.

Control circuitry 304 may allow a user to provide user profile information or may automatically compile user profile information. For example, control circuitry 304 may track user preferences and alert the user of content from unfollowed accounts which matches the user preferences. In some embodiments, control circuitry 304 monitors user inputs, such as queries, texts, calls, conversation audio, social media posts, etc., to detect user preferences. Control circuitry 304 may store the user preferences in the user profile. Additionally, control circuitry 304 may obtain all or part of other user profiles that are related to a particular user (e.g., via social media networks), and/or obtain information about the user from other sources that control circuitry 304 may access. As a result, a user can be provided with a unified social media experience across the user's different media devices.

Figure 4:
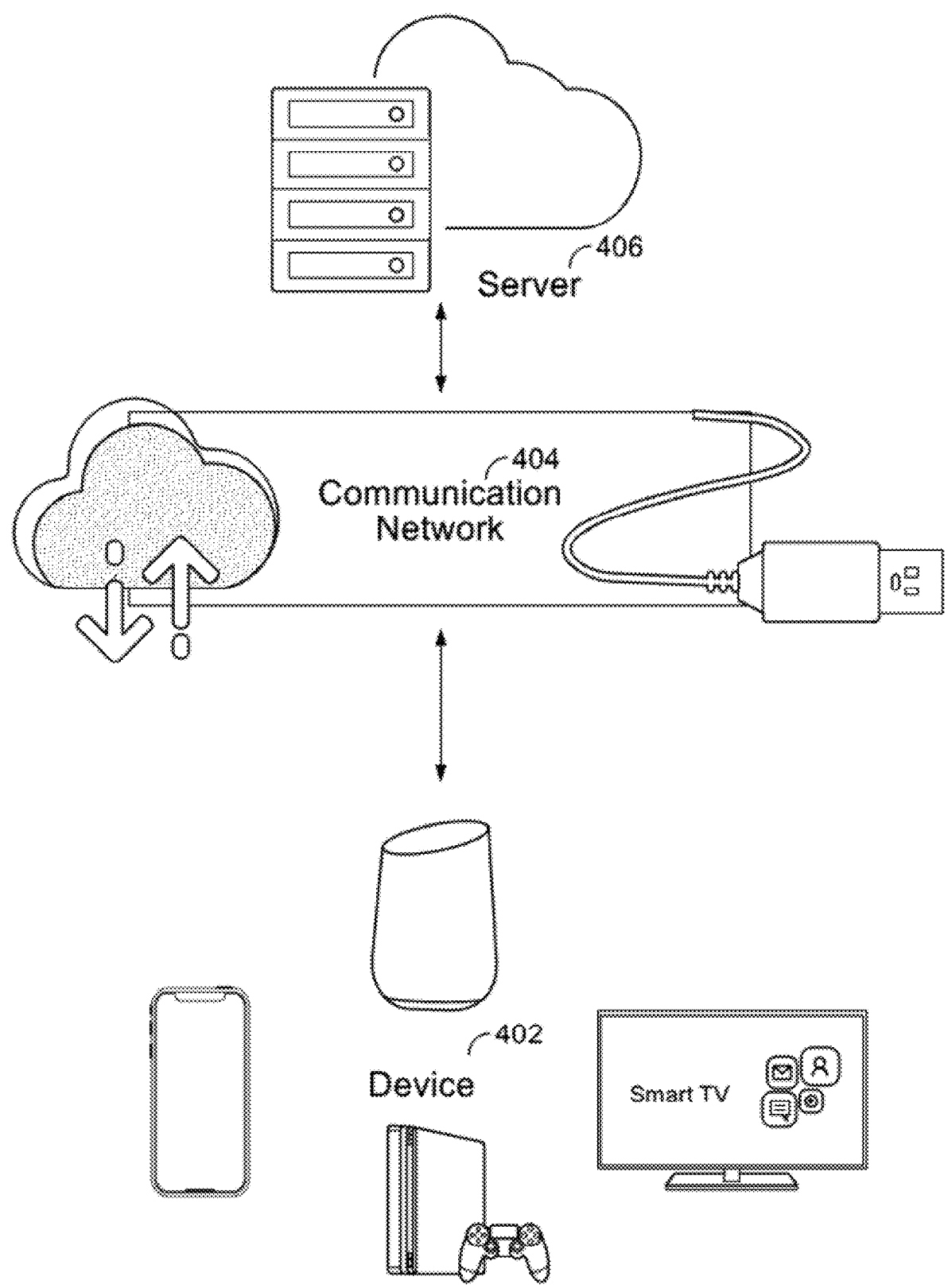
FIG. 4 is a block diagram of an illustrative media system, in accordance with some embodiments of the disclosure.

Media device 300 of FIG. 3 can be implemented in system 400 of FIG. 4 as media device 402. Media devices, on which notifications and content may be generated for display, may function as a standalone device or may be part of a network of devices. Various network configurations of devices may be implemented and are discussed in more detail below.

In system 400, there may be multiple media devices but only one of each is shown in FIG. 4 to avoid overcomplicating the drawing. In addition, each user may utilize more than one type of media device and also more than one of each type of media device.

As depicted in FIG. 4, media device 402 may be coupled to communication network 404. Communication network 404 may be one or more networks including the Internet, a mobile phone network, mobile voice or data network (e.g., a 4G or LTE network), cable network, public switched telephone network, Bluetooth, or other types of communications network or combinations of communication network. Thus, media device 402 may communicate with server 406 over communication network 404 via communications circuitry described above. In should be noted that there may be more than one server 406, but only one is shown in FIG. 4 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the system of FIG. 5 and the flowcharts of FIGS. 6-11.

Figure 5:
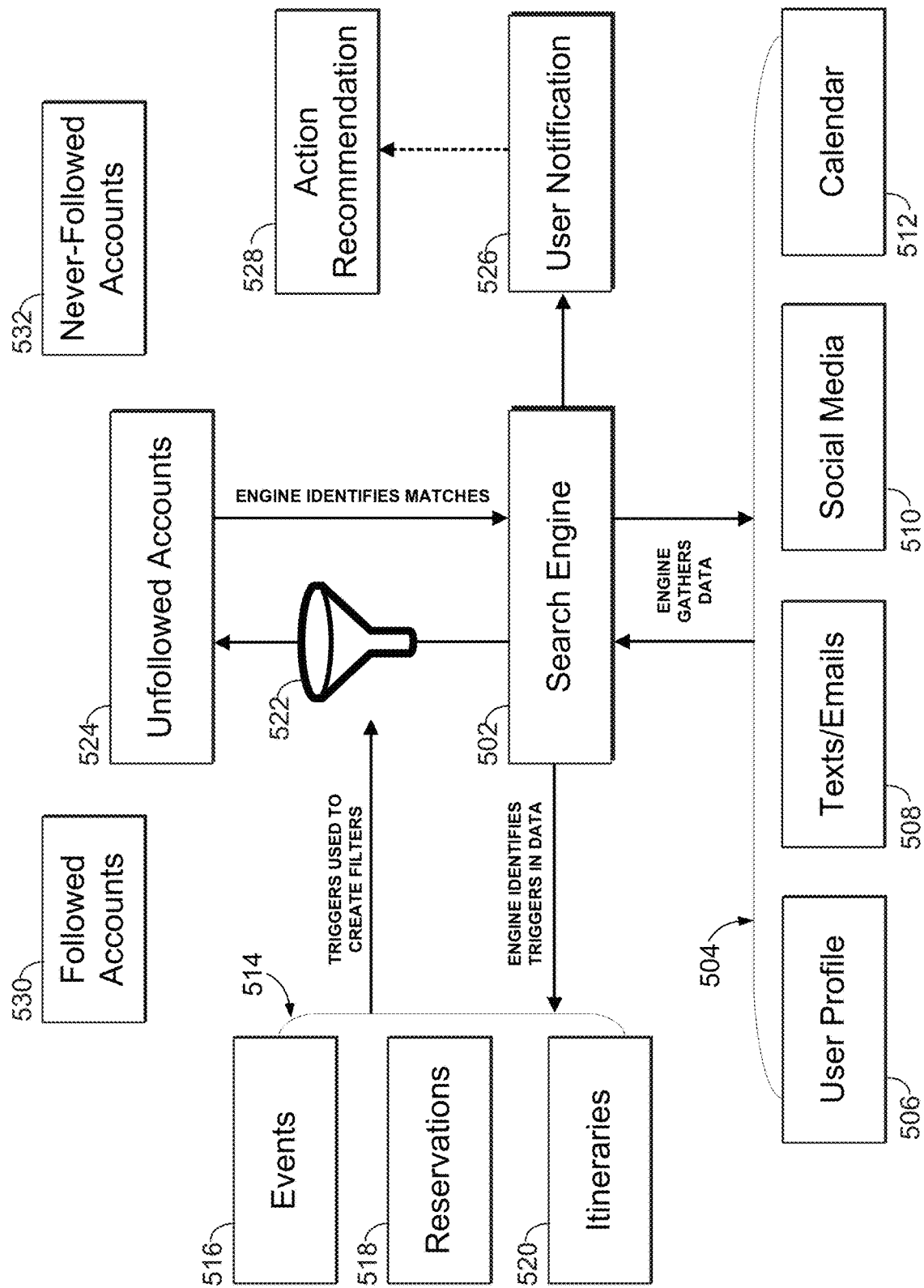
FIG. 5 is a block diagram of an illustrative search system for searching unfollowed accounts for activity relevant to a user, in accordance with some embodiments of the disclosure.

FIG. 5 is a diagram of an illustrative search system 500 for searching unfollowed accounts for activity relevant to a user, in accordance with some embodiments of the disclosure. As shown in FIG. 5, system 500 comprises a search engine 502 which gathers data about the user from various sources (e.g., sources 504). These sources may include user profiles for the user within the platform (e.g., user profile 506), texts and emails from the user's accounts and devices (e.g., texts/emails 508), social media posts and interests (e.g., social media 510), and calendars belonging to the user comprising various events and schedules (e.g., calendar 512). Search engine 502 may gather data from sources 504 including user preferences, plans, schedules, interests, settings, and other data.

Search engine 502 may identify triggers (e.g., triggers 514) within the data. For example, the system may identify a calendar entry within calendar 512. The search engine 502 may extract an event (e.g., event 516) from the calendar. Event 502 may comprise a name, a description, a list of attendees, a link to additional information, a location, a time, and other information. In some embodiments, the event may include an activity by the user on the platform. The system may identify an event in a post made by the user on the social media platform. For example, the user may post on the platform asking for recommendations for a trip that the user is planning for Paris in the fall. The system may determine the event, location, and time frame from information included in the post. In some embodiments, search engine 502 may extract a reservation (e.g., reservation 518) from the data. The reservation may be a restaurant reservation, a flight booking, a hotel booking, or another type of reservation. Search engine 502 may extract information associated with the reservation, such as location and time. The reservation may extend over various times and locations (e.g., for hotel and flight bookings). In these cases, the system may extract starting times and locations as well as ending times and locations of each segment of the reservation.

In some embodiments, the system may compile some of the data gathered from sources 504 into an itinerary (e.g., itineraries 520). The itinerary may comprise transportation information, schedules, events, reservations, and other information that comprises a trip. The system may use the data within the itinerary as triggers for creating search filters (e.g., filter 522) or may use the entire itinerary as a trigger. For example, search engine 502 may search multiple unfollowed accounts (e.g., unfollowed accounts 524) using a filter 522 comprising certain locations and/or corresponding time periods from the itinerary. The search filter allows system 500 to identify posts from unfollowed accounts 524 that are relevant and useful to the user. If any posts from unfollowed accounts match a location and/or corresponding time period, the system may notify the user of those posts (e.g., via user notification 526). In some embodiments, user notification 526 may be a push notification on the user's device (e.g., media device 402 of FIG. 4). In some embodiments, user notification 526 may be an addition of the post to the user's feed within the platform. In some embodiments, the user notification 526 may include an option to view or ignore the post from the unfollowed account. The system may then recommend an action (e.g., via action recommendation 528). For example, as in FIG. 1, the system may determine, based on flight and hotel bookings, that the user will be in Paris during the first week of July. The system may create filters (e.g., filter 522) for relevant posts from unfollowed accounts that relate to Paris (e.g., based on the location or time period). The system may identify an unfollowed account containing a posts raving about a new restaurant in Paris. The system may notify the user of the post and additionally recommend an action. For example, the system may recommend that the user make a reservation at the restaurant during the user's trip to Paris and may redirect the user to the restaurant's reservation site or may provide the user with the restaurant's phone number and hours.

In some embodiments, the system may additionally search accounts that the user follows (e.g., followed accounts 530) and accounts that the user has never followed (e.g., never-followed accounts 532). The system may search the followed accounts 530 and never-followed accounts 532 using the same filters 522. In some embodiments, the system may search these different types of accounts using different relevance thresholds, as will be discussed in detail in relation to FIG. 10.

It will be understood that system 500 is merely illustrative and that various modification can be made in accordance with the present disclosure. System 500 may additionally build upon existing search functionalities of social media platforms.

Figure 6:
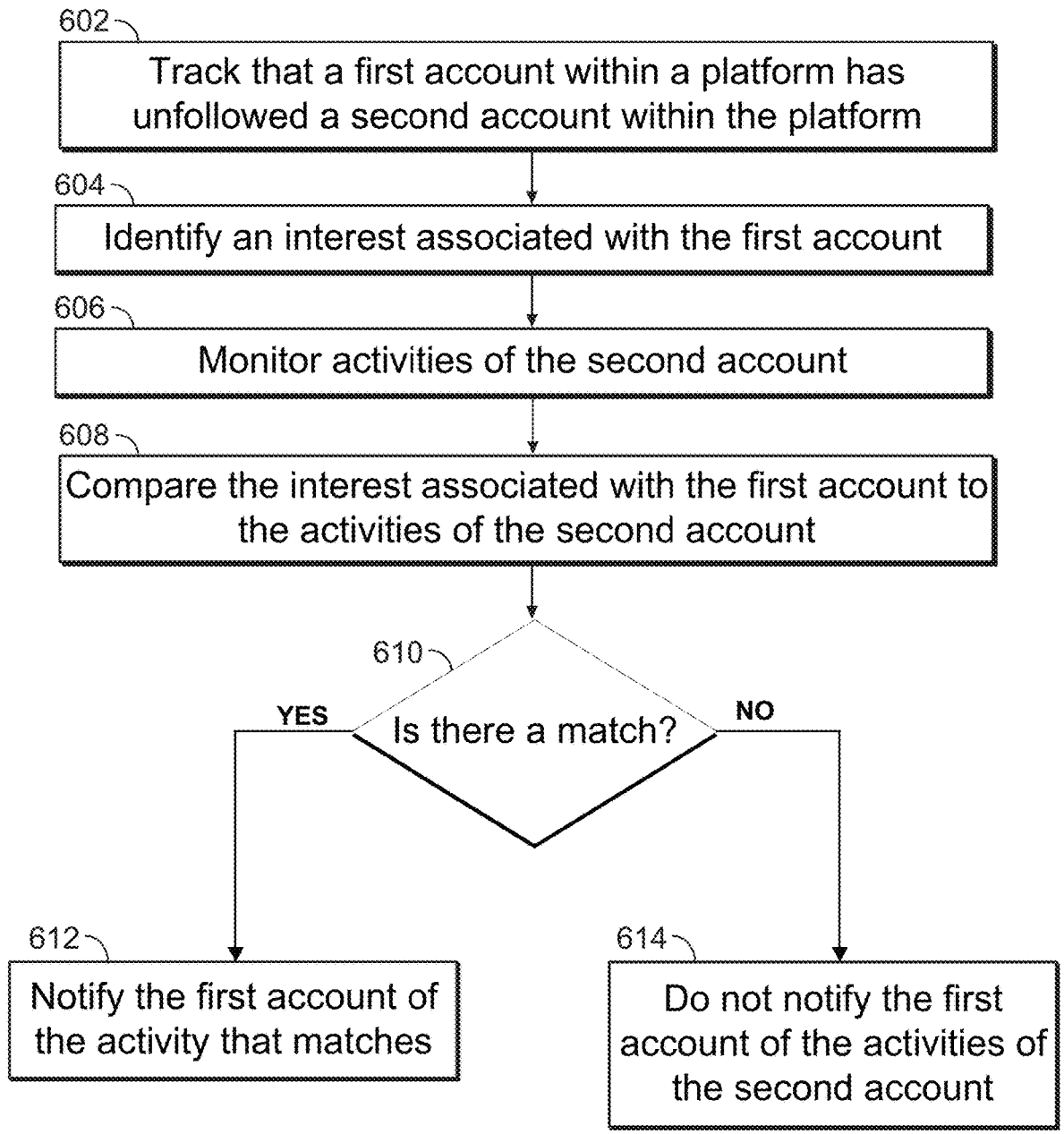
FIG. 6 is a flowchart of an illustrative process for notifying a user of relevant activity from unfollowed accounts, in accordance with some embodiments of the present disclosure.

FIGS. 6-11 show multiple processes that can be implemented, for example, using the system of FIG. 5. FIG. 6 is a flowchart of an illustrative process 600 for notifying a user of relevant activity from unfollowed accounts, in accordance with some embodiments of the present disclosure. As shown in FIG. 6, process 600 determines an interest of a first account and searches for relevant information among posts from accounts that the first account has unfollowed. If the system (e.g., control circuitry 304) identifies a match, the system notifies the first account of the relevant post. By performing a refined search of posts from unfollowed accounts, process 600 ensures that the user will receive relevant information without needing to view unfollowed accounts.

At step 602, the system (e.g., control circuitry 304) tracks that a first account within a platform has unfollowed a second account within the platform. For example, the system 600 may track the accounts which the first account follows. If the first account removes a second account from the follow list, the system may store the second account in a list of unfollowed accounts. The list of unfollowed accounts may be stored so that the system may access the list at a later time (e.g., in storage 308 or in cloud-based storage) and may or may not be accessible to the user of the first account. The list may be separate from a list of accounts that the user does not follow and has not previously followed.

At step 604, the system identifies an interest associated with the first account. As described in connection with FIG. 5, the system may determine an interest by searching through data associated with the first account (e.g., user profile, texts/emails, social media, calendars, etc.). The interest may include a preference of the user (e.g., a favorite band, a city the user would like to visit, or a favorite type of food), an event the user will attend, an upcoming reservation, a travel itinerary, or another interest (e.g., based on a post to the social media platform). For example, the system may identify a post by the user to the platform asking for a recommendation for a seafood restaurant in Cape Cod this weekend. The system may identify this as an interest of the user. The system may extract metadata from the interest, such as a title, a location and corresponding time, a date range, or other identifying information. The system may use this metadata to create search filters.

At step 606, the system monitors activities of the unfollowed second account. For example, the system may await new activity from the second account such as a new post, a check-in to a new location, a new status, or another update. As another example, the system may access historical activity from the second account.

At step 608, the system compares the interest of the first account to the activities of the unfollowed second account. This comparison may comprise applying a search filter based on the interest of the first account to the activities of the unfollowed second account. The system may search the activities using several filters corresponding to several interests. For example, if the user has an upcoming trip to Paris, the system may search various locations and dates within the itinerary, as well as particular events or establishments that the user plans to attend.

At step 610, the system determines whether there is a match between the interest associated with the first account and the activities of the unfollowed second account. The system may identify that the interest and activity have a piece of metadata in common, such as the title of an event, the location and/or time, the same date range, a similar description, or another piece of data. If the system determines that there is a match, process 600 continues at step 612. If the system determines that there is not a match, process 600 continues at step 614.

At step 612, the system notifies the first account of the activity of the unfollowed second account that matches the interest of the first account. In some embodiments, the user notification may be a push notification on the user's device (e.g., media device 402). In some embodiments, the user notification may be an addition of the post to the user's feed within the platform. In some embodiments, the user notification may include an option to view or ignore the post from the unfollowed account. The system may additionally prompt the user to configure notification preferences, such as in FIG. 2.

At step 614, in the absence of a match, the system (e.g., control circuitry 304) may not notify the first account of activities of the unfollowed second account. As such, the first account will not receive push notifications for updates to the unfollowed second account and will not see posts from the unfollowed second account in the feed on the platform.

It will be understood that process 600 is merely illustrative and that various modification can be made in accordance with the present disclosure.

Figure 7:
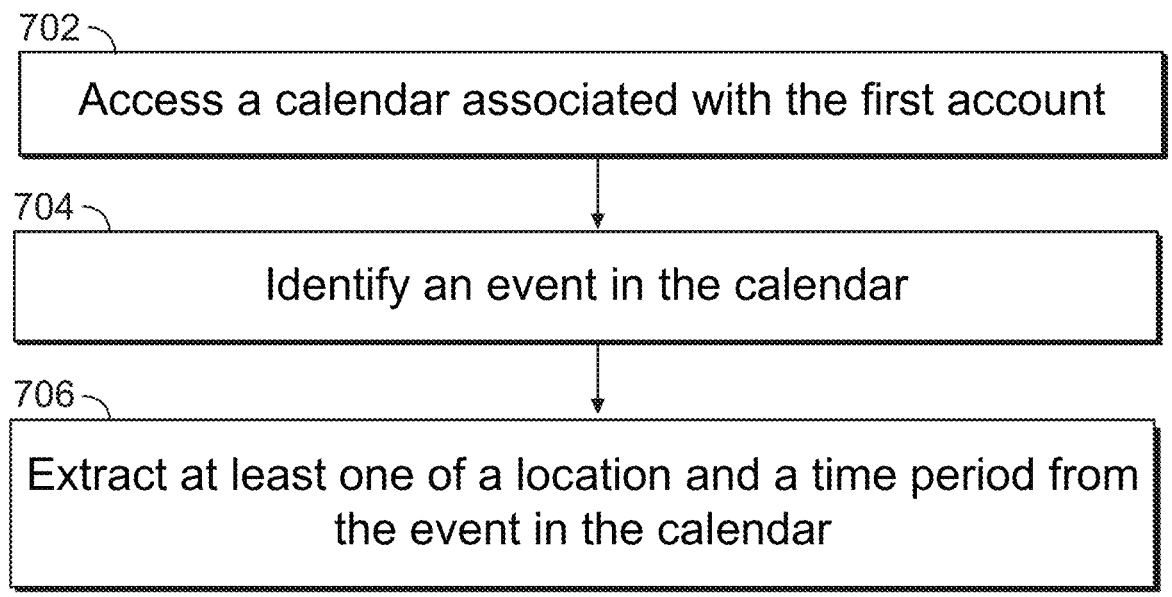
FIG. 7 is a flowchart of an illustrative process for identifying an interest associated with an account based on an event, in accordance with some embodiments of the present disclosure.

FIG. 6 is a generalized process comprising embodiments illustrated in more detail in FIGS. 7-11. FIG. 7 is a flowchart of an illustrative process 700 for identifying an interest associated with an account based on an event, in accordance with some embodiments of the present disclosure. In some embodiments, FIG. 7 shows a method of performing step 604 of FIG. 6. As shown in FIG. 7, process 700 extracts data from a calendar associated with the first account and uses the extracted data to identify matches between the interest of the first account and an activity of the unfollowed second account. This process allows the user to receive information relevant to upcoming events from unfollowed accounts.

At step 702, the system (e.g., control circuitry 304) accesses a calendar associated with the first account. In some embodiments, the calendar may be a calendar within the platform, such as a calendar of events to which the user has RSVP-ed within the platform. In some embodiments, the calendar may exist on another platform that is tied to the first account. For example, the system may be able to retrieve calendar information from another social media platform or a communications platform belonging to the first account. In some embodiments, the calendar may be stored locally in a calendar application on the user's device (e.g., media device 402).

At step 704, the system identifies an event in the calendar. The system may determine that there is an upcoming entry in the calendar that relates to a public event, a trip, a location, or another identifiable trait. The system may additionally set a time period within which the system will identify events. For example, the system may identify events within a calendar falling within the upcoming month. The system may additionally apply different time periods for different types of events. For example, the system may identify local events within the next month and travel-related events within the next three months. The system may additionally identify events requiring tickets or reservations within a larger window.

At step 706, the system extracts at least one of a location and a time period from the event in the calendar. In some embodiments, the location and time period may be recorded in the calendar entry. In some embodiments, the system may search for a location and time period within external databases based on metadata or identifying information from a calendar entry. For example, if the system identifies an event called "Benefit at School," the system may identify that "school" relates to the school district in the user's area. The system may then search for upcoming events at the school that are related to "benefit." The system may find a matching event on a calendar on the school's website. The system may thus extract a location and time period of the benefit from the calendar on the school's website.

In some embodiments, the system identifies a match between the interest associated with the first account and the activity of an unfollowed second account based on determining that the activity is associated with the at least one of the location and the time period of the event identified in FIG. 7. For example, the system may search through the activities of unfollowed accounts for activities matching the location and time period extracted at step 706. If the location and time period of the activity match the location and time period of the benefit, the system may determine that the activity and the benefit match. For example, the system may identify that an account that the user has unfollowed posted about attending the upcoming benefit. The user may be interested to learn that the person associated with the unfollowed account will be attending the event, as this may impact the user's own plans to attend the event. The system may therefore notify the user about the post from the unfollowed account.

It will be understood that process 700 is merely illustrative and that various modification can be made in accordance with the present disclosure.

Figure 8:
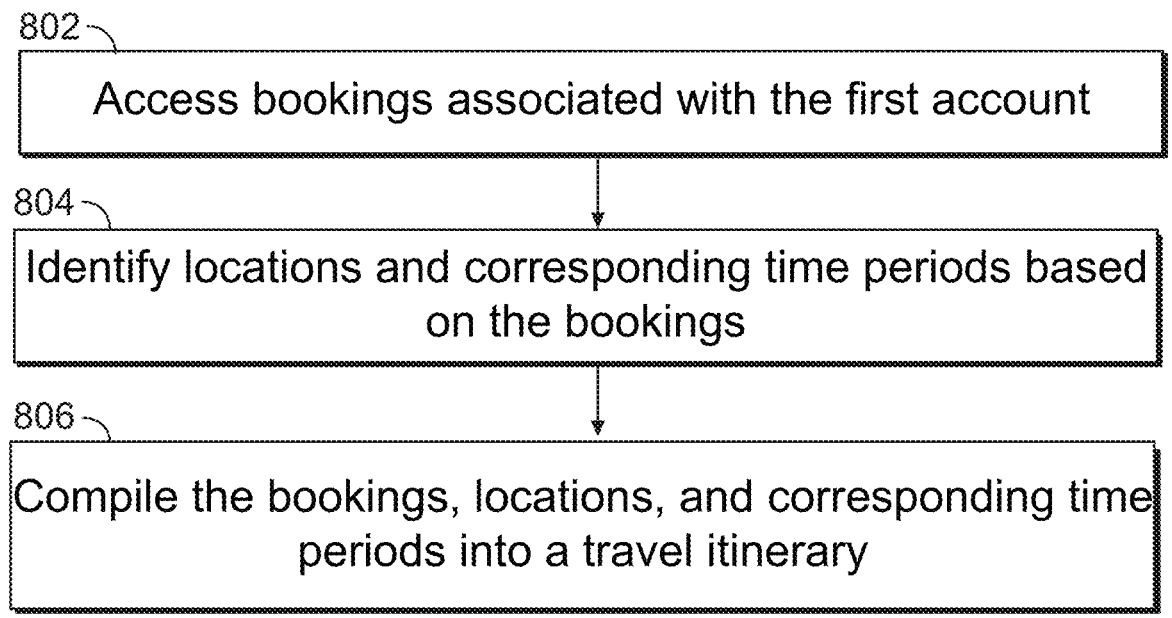
FIG. 8 is a flowchart of an illustrative process for identifying an interest associated with an account based on an itinerary, in accordance with some embodiments of the present disclosure.

FIG. 8 is a flowchart of an illustrative process 800 for identifying an interest associated with an account based on an itinerary, in accordance with some embodiments of the present disclosure. In some embodiments, FIG. 8 shows another method of performing step 604 of FIG. 6. As shown in FIG. 8, process 800 compiles bookings (e.g., reservations, flights, tickets, etc.) into a travel itinerary. The system can then identify a match between an interest of a first account and an activity of an unfollowed account based on the information in the travel itinerary. This process allows the user to receive, for example, notifications about updates relating to upcoming travel plans from unfollowed accounts.

At step 802, the system (e.g., control circuitry 304) accesses bookings associated with the first account. In some embodiments, the system may parse through text and email data for confirmation messages and emails related to bookings. For example, the system may identify an email confirming plane tickets to and from Paris and a text from a tour guide confirming the details of a historic tour of Paris.

At step 804, the system identifies locations and corresponding time periods based on the bookings. For example, the system may extract the location and time information from the metadata of the bookings (e.g., in confirmation emails and/or texts). The system may store the location and time information in storage (e.g., storage 308).

At step 806, the system compiles the bookings, locations, and corresponding time periods into a travel itinerary. For example, the system may arrange the bookings into a schedule for the length of the trip. The itinerary may include travel time between locations as well as transportation information. The itinerary may additionally include descriptions of the itinerary entries as well as contact information, advisories, and reminders. The travel itinerary may be accessible to the user or may be stored separately from the platform for the system to reference (e.g., in storage 308). In some embodiments, the system may include implied locations and times when compiling the itinerary. For example, if the user's itinerary indicates that the user will be driving from Paris to Marseille on a certain day, the system may identify that the user will be driving through Orleans at a certain time. The system may therefore include travel routes, methods of transportation, and time periods in the travel itinerary.

In some embodiments, the system identifies a match between the interest and an activity of an unfollowed account by determining that the activity is associated with a location and/or a corresponding time period in the travel itinerary. For example, the system may identify a post from an unfollowed account that matches a location and/or time along the user's travel route in the itinerary. For instance, the system may identify that the post includes information about a festival in Orleans during the time that the user will be passing through the town. The user may be interested to learn this information, as the user may wish to leave extra time to attend the festival or may wish to take an alternate route to avoid extra traffic caused by the festival. In this example, the system may alert the user of the post based on the match between the post and the itinerary.

It will be understood that process 800 is merely illustrative and that various modification can be made in accordance with the present disclosure.

Figure 9:
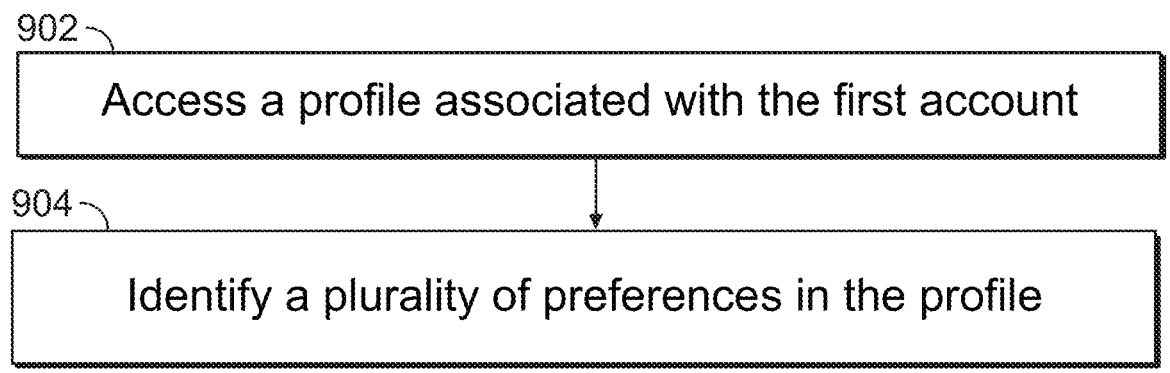
FIG. 9 is a flowchart of an illustrative process for identifying an interest associated with an account based on user preferences, in accordance with some embodiments of the present disclosure.

FIG. 9 is a flowchart of an illustrative process 900 for identifying an interest associated with an account based on user preferences, in accordance with some embodiments of the present disclosure. In some embodiments, FIG. 9 shows another method of performing step 604 of FIG. 6. As shown in FIG. 9, process 900 may identify a number of user preferences within a user profile and use these preferences to identify a relevant post by an unfollowed account. This process allows the system to alert the user of posts of interest even if the posts are made by an unfollowed account.

At step 902, the system (e.g., control circuitry 304) accesses a profile associated with the first account. For example, the system may identify a profile including personal and information, settings, preferences, and other information. The profile may be the user's profile within the same platform as the first account or may exist on another platform. For example, the user may have multiple social media profiles across multiple platforms and the system may access one or multiple of these accounts.

At step 904, the system identifies a plurality of preferences in the profile. A preference may include something that the user has "liked," an interest related to a page or account that the user follows, or an interest that the user has indicated in the user profile. For example, preferences may include a favorite band, a favorite type of food or restaurant, a city the user would like to visit, or another interest. In some embodiments, the system may determine a preference based on a post that he user has made to the social media platform. For example, if the user posts about a favorite book, the system may identify the book, author, and genre as interests of the user.

In some embodiments, the system identifies a match between the interest and the activity of an unfollowed account by determining that the activity relates to a preference in the profile. The system may make this determination by matching keywords between the preferences and posts from unfollowed accounts. For example, if the user has indicated an interest in the band "Florence and the Machine" in the user profile, the system may search unfollowed accounts for posts containing the words "Florence" and "Machine." If there is a post from an unfollowed account containing the keywords, the system may determine that the post is relevant to the user's preferences and therefore may identify the post as a match.

It will be understood that process 900 is merely illustrative and that various modification can be made in accordance with the present disclosure.

Figure 10:
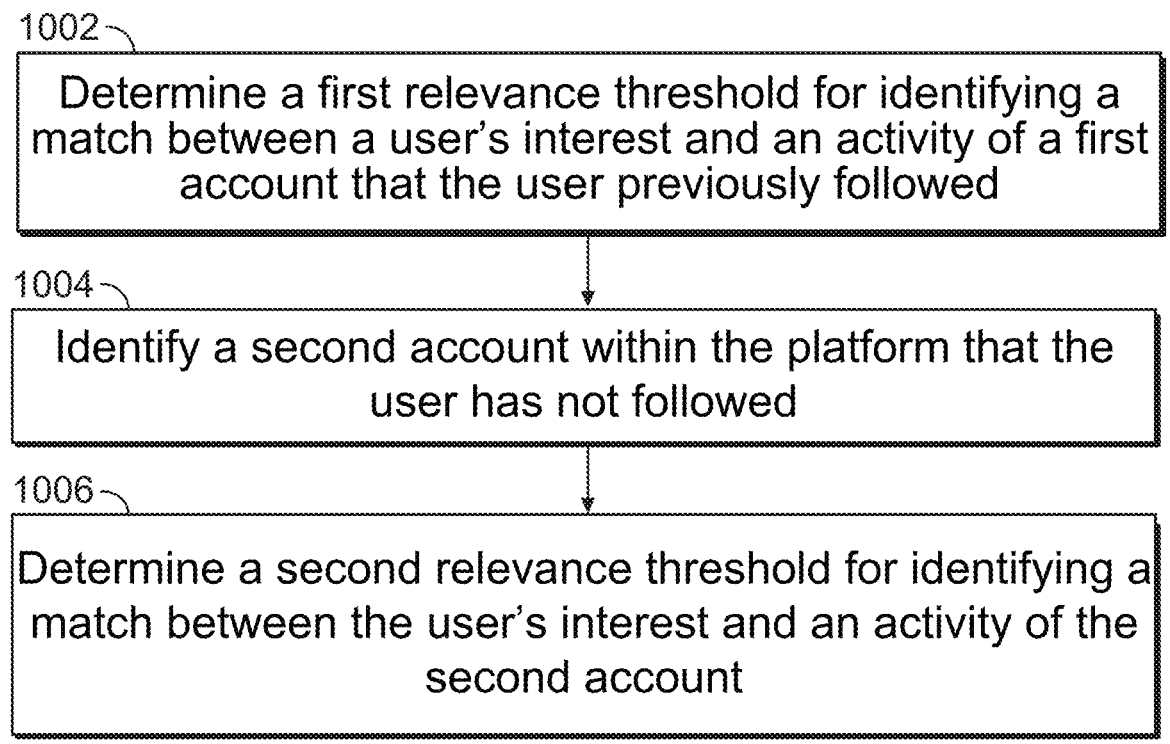
FIG. 10 is a flowchart of an illustrative process for setting a higher relevance threshold for unfollowed accounts than accounts that were not previously followed, in accordance with some embodiments of the present disclosure.

FIG. 10 is a flowchart of an illustrative process for setting a higher relevance threshold for unfollowed accounts than accounts that were not previously followed, in accordance with some embodiments of the present disclosure. As shown in FIG. 10, process 1000 determines a first relevance threshold for activities from unfollowed accounts and a second relevance threshold for activities from never-followed accounts. These relevance thresholds allow the system to provide the most relevant information from unfollowed and never-followed accounts.

At step 1002, the system (e.g., control circuitry 304) determines a first relevance threshold for identifying a match between a user's interest and an activity of an unfollowed account. In some embodiments, the system may prompt the user for a relevance threshold, for example by prompting the user to indicate if they would like to see all relevant posts from unfollowed accounts or only very relevant posts from unfollowed accounts. In some embodiments, the system may preconfigure a first relevance threshold for unfollowed accounts in the settings. In some embodiments, the first relevance threshold may be different across different platforms.

At step 1004, the system identifies a second account within the platform that he user has not followed. For example, the system identifies a never-followed account. The system may use various methods to distinguish never-followed accounts from unfollowed accounts, such as tagging or keeping separate lists of accounts.

At step 1006, the system determines a second relevance threshold for identifying a match between the user's interest and an activity of the never-followed account. In some embodiments, the second relevance threshold may be preconfigured in the settings. In some embodiments, the first relevance threshold may be different across different platforms. For example, each social media platform may have an algorithm for displaying or recommending content to users from never-followed accounts. Process 1000 may build upon algorithms in existing platforms or may introduce a new algorithm for determining a relevance threshold for never-followed accounts.

In some embodiments, the first relevance threshold may be lower than the second relevance threshold. For example, the system may set the first relevance threshold lower, as the "unfollowed" status indicates the user's previous interest in an account. The unfollowed account is therefore more likely to contain relevant information than a never-followed account. This ensures that the user is presented with the most relevant information.

In some embodiments, the system may determine a third relevance threshold for accounts that the user follows. The relevance threshold may be significantly lower for followed accounts than for unfollowed accounts and never-followed accounts. In some embodiments, the third relevance threshold may be used to determine where a post appears in a feed and/or whether the user receives a notification about the post.

In some embodiments, the system may determine a relevance score for a match between a user's interest and an activity of an unfollowed account based on how close the match is between the interest and the activity. For example, the system may match an activity of an unfollowed account to a preference of the user using keyword matching and may determine that the activity contains all of the keywords of the preference (e.g., "Florence" and "Machine). The system may therefore determine that the activity has a high relevance level. In another scenario, the system may determine that the location tagged in a post from an unfollowed account is an exact match to a location of an event the user will attend. The system may determine that the post is therefore relevant and important for the user to see and may raise the relevance score.

It will be understood that process 1000 is merely illustrative and that various modification can be made in accordance with the present disclosure.

Figure 11A:
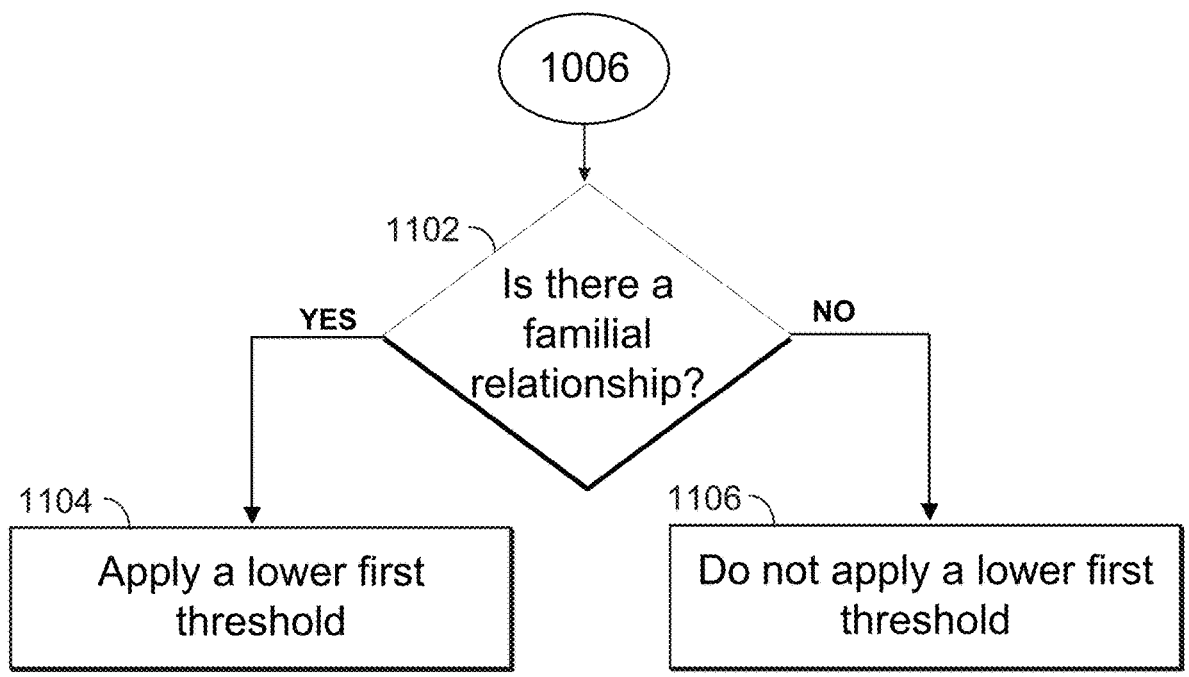
FIG. 11A is a flowchart of an illustrative process for setting a lower relevance threshold when there is a familial relationship between two accounts, in accordance with some embodiments of the present disclosure.
Figure 11B:
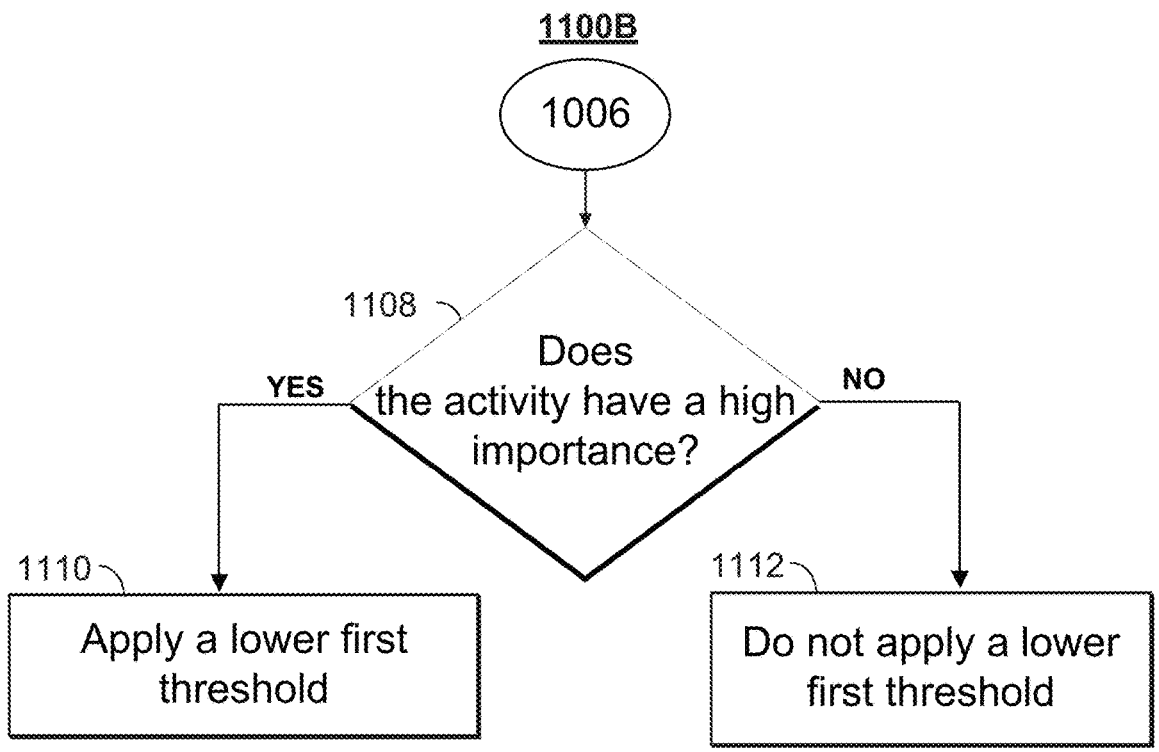
FIG. 11B is a flowchart of an illustrative process for setting a lower relevance threshold when an activity of an unfollowed account has a high importance, in accordance with some embodiments of the present disclosure.

FIGS. 11A and 11B are flowcharts of illustrative processes for applying higher or lower thresholds for unfollowed accounts. In some embodiments, FIGS. 11A and 11B are continuations of step 1006 of FIG. 10. FIG. 11A is a flowchart of an illustrative process 1100A for applying a lower relevance threshold when there is a familial relationship between two accounts, in accordance with some embodiments of the present disclosure. As shown in FIG. 11A, process 1100A applies a lower relevance threshold for posts from unfollowed accounts when there is a familial relationship between the accounts. This allows the user to receive important information about family regardless of whether the user has chosen to unfollow the account.

At step 1102, the system determines whether there is a familial relationship between the first account and the unfollowed account. In some embodiments, the system may identify a familial relationship based on a user indication within the platform that the account belongs to a family member. In some embodiments, the system may identify a familial relationship based on mutual friends or followers within the platform. For example, if the accounts share many of the same friends or followers and all of the accounts have a common feature (e.g., same last name) then the system may determine that the user and the unfollowed account likely share a familial relationship. If the system determines that there is a familial relationship, process 1000A may continue to step 1104. If the system determines that there is no familial relationship, process 1000A may continue to step 1106.

At step 1104, the system applies a lower first relevance threshold. In some embodiments, this may allow the system to provide more updates to the user from unfollowed family members.

At step 1106, the system does not apply a lower first relevance threshold. Therefore the system may retain the same first relevance threshold as determined in step 1002 of FIG. 10.

It will be understood that system 1100A is merely illustrative and that various modification can be made in accordance with the present disclosure.

FIG. 11B is a flowchart of an illustrative process 1100B for applying a lower relevance threshold when an activity of an unfollowed account has a high importance, in accordance with some embodiments of the present disclosure. As shown in FIG. 11B, process 1100B applies a lower threshold for activities with high importance than for activities not having a high importance level.

At step 1108, the system determines whether the activity has a high importance. The system may determine the importance based on the type of activity. For example, a birthday or holiday post may be marked as more important than a post not relating to a special event. In some embodiments, the system may raise the importance based on the presence of certain words. For example, if the words "concert," "meet-and-greet," or "tour" are included in a post about "Florence and the Machine," the system may determine that the post is important for the user to view and my increase the importance. If the system determines that the activity has a high importance, the process continues at step 1110. If the system determines that the activity does not have a high importance, the process continues at step 1112.

At step 1110, the system applies a lower first relevance threshold. In some embodiments, this may allow the system to alert the user of importance updates that are relevant to the user.

At step 1112, the system does not apply a lower first relevance threshold. Therefore the system may retain the same first relevance threshold as determined in step 1002 of FIG. 10.

It will be understood that process 1100B is merely illustrative and that various modification can be made in accordance with the present disclosure.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    determining that a user interface associated with a first social media account is preventing display of social media activity associated with a plurality of social media accounts previously followed and currently unfollowed by the first social media account;
    detecting a social media activity associated with a second social media account of the plurality of social media accounts;
    determining that an interest associated with the first social media account matches the social media activity associated with the second social media account;
    in response to determining that the interest matches the social media activity:
        retrieving an account identifier of the second social media account;
        temporarily overriding the preventing the display for the second social media account; and
        causing to be displayed, at the user interface, an interactive notification indicating:
            (i) the account identifier of the second social media account;
            (ii) that the second social media account is presently unfollowed; and
            (iii) the interest associated with the first social media account; and
            (iv) the social media activity associated with the second social media account.

2. The method of claim 1, wherein determining that the user interface is preventing the display comprises detecting an active setting of the user interface that prevents the display.

3. The method of claim 1, further comprising:
receiving a selection of the interactive notification; and
in response to receiving the selection, causing to be displayed at the user interface the social media activity on a social media platform associated with the second social media account.

4. The method of claim 3, further comprising:
retrieving secondary content associated with the social media activity; and
in response to receiving the selection, causing to be displayed at the user interface the secondary content concurrently with the display of the social media activity.

5. The method of claim 1, wherein the account identifier comprises one of a profile picture, a profile name, and a social media handle.

6. The method of claim 1, wherein the account identifier comprises a selectable option to re-follow the second social media account.

7. The method of claim 1, wherein the interactive notification comprises a selectable option to ignore the social media activity.

8. The method of claim 1, wherein determining that the interest matches the social media activity comprises:
determining a relevance threshold for the first social media account;
comparing the social media activity to the relevance threshold; and
determining, based on the comparing, that the social media activity exceeds the relevance threshold.

9. The method of claim 8, wherein determining the relevance threshold comprises:
determining a relationship type between the first social media account and the second social media account; and
modifying the relevance threshold based on the relationship type.

10. The method of claim 8, wherein determining the relevance threshold comprises:
determining an importance level of the social media activity; and
modifying the relevance threshold based on the importance level.

11. A system comprising:
display circuitry configured to display a user interface; and
control circuitry configured to:
determine that the user interface associated with a first social media account is preventing display of social media activity associated with a plurality of social media accounts previously followed and currently unfollowed by the first social media account;
detect a social media activity associated with a second social media account of the plurality of social media accounts;
determine that an interest associated with the first social media account matches the social media activity associated with the second social media account;
in response to determining that the interest matches the social media activity:
retrieve an account identifier of the second social media account;
temporarily override the preventing the display for the second social media account; and
cause to be displayed, at the user interface via the display circuitry, an interactive notification indicating:
(i) the account identifier of the second social media account;
(ii) that the second social media account is presently unfollowed; and
(iii) the interest associated with the first social media account; and
(iv) the social media activity associated with the second social media account.

12. The system of claim 11, wherein the control circuitry, when determining that the user interface is preventing the display, is configured to detect an active setting of the user interface that prevents the display.

13. The system of claim 11, wherein the control circuitry is further configured to:
receive a selection of the interactive notification; and
in response to receiving the selection, cause to be displayed at the user interface the social media activity on a social media platform associated with the second social media account.

14. The system of claim 13, wherein the control circuitry is further configured to:
retrieve secondary content associated with the social media activity; and
in response to receiving the selection, cause to be displayed at the user interface the secondary content concurrently with the display of the social media activity.

15. The system of claim 11, wherein the account identifier comprises one of a profile picture, a profile name, and a social media handle.

16. The system of claim 11, wherein the account identifier comprises a selectable option to re-follow the second social media account.

17. The system of claim 11, wherein the interactive notification comprises a selectable option to ignore the social media activity.

18. The system of claim 11, wherein the control circuitry, when determining that the interest matches the social media activity, is configured to:
determine a relevance threshold for the first social media account;
compare the social media activity to the relevance threshold; and
determine, based on the comparing, that the social media activity exceeds the relevance threshold.

19. The system of claim 18, wherein the control circuitry, when determining the relevance threshold, is configured to:
determine a relationship type between the first social media account and the second social media account; and
modify the relevance threshold based on the relationship type.

20. The system of claim 18, wherein the control circuitry, when determining the relevance threshold, is configured to:
determine an importance level of the social media activity; and
modify the relevance threshold based on the importance level.

* * * * *